United States Patent [19]

Cotsman et al.

[11] Patent Number: 4,995,493
[45] Date of Patent: Feb. 26, 1991

[54] ROBOT TOOL CHANGER AND OVERLOAD DEVICE

[75] Inventors: David N. Cotsman, Southfield; John Kovach, Utica; Dante C. Zuccaro, Allenton; Frank J. Kudwa, Swartz Creek, all of Mich.

[73] Assignee: General Motors Corporation, Detroit, Mich.

[21] Appl. No.: 487,520

[22] Filed: Mar. 2, 1990

[51] Int. Cl.⁵ .......................... B25J 17/00; B25J 19/00
[52] U.S. Cl. .............................. 192/150; 192/84 PM; 403/DIG. 1; 901/49
[58] Field of Search ................ 192/150, 84 PM, 56 F; 901/49; 403/41, DIG. 1

[56] References Cited

U.S. PATENT DOCUMENTS

| | | | |
|---|---|---|---|
| 4,759,686 | 7/1988 | Kirst | 901/49 X |
| 4,793,053 | 12/1988 | Zuccaro et al. | 901/31 X |
| 4,806,864 | 8/1989 | Cwycyshyn et al. | 192/150 X |
| 4,842,114 | 6/1989 | Hepp | 192/150 X |

Primary Examiner—Rodney H. Bonck
Attorney, Agent, or Firm—Ernest E. Helms

[57] ABSTRACT

A robot tool changer and overload device has first and second separable plates adapted to be respectively connected to a robot arm and to an end of arm tooling device (EOAT) for the robot; a magnet is connected to one of the plates and a steel insert is connected to the other of the plates for providing a magnetic attraction therebetween for holding the first and second plates together; a pair of frustoconical bearing surfaces are formed on the first and second plates at an angle and a depth to interconnect the plates during normal operation and operative to produce pivotal release movement between the plates when an overload force is applied thereto; a flange on one of the plates is adapted to be removably received within a tool cage to cooperate with structure for applying a pneumatic release force between the first and second plates to allow separation therebetween along a Z axis without imposing an overload force on the robot arm.

10 Claims, 3 Drawing Sheets

ROBOT TOOL CHANGER AND OVERLOAD DEVICE

TECHNICAL FIELD

This invention relates to overload devices for releasing an end of arm tooling device (EOAT) from a robot arm to prevent imposition of overloads on the robot arm, and more particularly, to such devices including a robot tool changer plate adapted to be removably received within a tool cage.

BACKGROUND OF THE INVENTION

Robot tool changers are known which include a first plate that is adapted to be connected to a robot arm and a second plate that is adapted to be connected to an end of the arm tool for the robot. In such arrangements, a coupling system is provided between the first and second plates for aligning the plates and connecting them together for securing the end of the arm tool to the robot arm and to provide a strong joint between the first and second plates during operation of the robot. An example of such a tool changer is set forth in U.S. Pat. No. 4,793,053 which is assigned to the assignee of the subject application.

In the '053 patent, a pair of deep draft frustoconical annular surfaces are provided therebetween to provide a strong non-tilt release joint between the first and second plates. The frustoconical surfaces have a depth and a bearing surface which prevents separation of the first and second plates other than along the Z axis or longitudinal axes of the connected plates.

Other devices are provided between the robot arm and an EOAT to prevent an overload force from being imposed on the robot arm during its operation. One such system is set forth U.S. Pat. No. 4,860,864 assigned to an assignee common to that of the present application.

In the '405 application, a magnet and a steel plate are connected between first and second plates of the device to maintain a magnetic attraction therebetween to complete a joint between a robot arm and an end of arm tool device. The magnetic force is broken to decouple the end of arm tool from the robot arm by providing cam surfaces on one of the plates and a tapered nest configuration on the opposite plate to cause the magnet to be separated from the steel plate insert on the other of the plates when one of the plates is moved torsionally along at least one of three coordinate linear axes when a load applied to the end of the arm device exceeds an overload force condition on the robot arm.

While the aforesaid robot tool changer of the '053 patent and the break away connection of the '405 application are suitable for their intended purposes, neither the tool changer device nor the break away device have the capability of performing the functional purpose of the other.

SUMMARY OF THE INVENTION AND ADVANTAGES

Accordingly, one feature of the present invention is to provide a unitary device between a robot and an EOAT combining both tool changer and overload release functions in a unitary device having a single pair of separable plates.

Another feature is to provide such a unitary device having separable plates held together by magnet means and including break away surfaces thereon to allow the first and second plates to pivot apart upon the occurrence of an overload condition on the EOAT that might damage the robot arm.

Still another feature is to provide a pneumatic release system between the first and second plates operative to produce separation therebetween independently of the imposition of any overload moment thereon to allow movement of the first plate from the second plate in a Z axis when an EOAT is nested in its tool crib.

Another feature of the present invention is to provide an improved robot tool changer and overload device having first and second plates respectively connected to a robot and an EOAT and including a magnet therebetween to produce a magnetic force for holding &he first and second plates together and wherein the first and second plates have coacting frustoconical surfaces thereon that define a pivot point completely around the circumference of the joined plates for separating the plates when a moment is applied therebetween of a magnitude to overload the robot arm.

Still another feature of the present invention is to provide the tool changer and overload device of the preceding object wherein the frustoconical surfaces have a depth and an angle selected to produce complete separation between the first and second plates when an overload moment is applied thereto; and wherein means are provided to pneumatically release the first and second plates in a Z axis without imposing any excessive load on the robot arm when the device is supported in a tool crib nest.

It is another object of the present invention to provide a improved robot tool changer and overload device having first and second plates respectively connectible to a robot arm and to an EOAT and including magnet means for producing a magnetic force for holding the first and second plates together during normal robot operation, and further, including means for forming coacting support surfaces on each of the first and second plates that form a mechanical joint between the first and second plates under normal robot operation and wherein the coacting surfaces have an angle inclined with respect to the Z axes of the first and second plates to produce separation of the first and second plates by pivotal movement therebetween at the annular outer edge of the support surfaces when an overload is applied to one of the plates.

Still another object of the present invention is to provide the robot tool changer and overload device of the preceding object wherein pneumatic release means are provided between the first and second plates for producing separation of the plates without pivotal movement therebetween.

Still another object of the present invention is to provide an improved robot tool changer and overload device for controlling the separation between first and second plates respectively connected to a robot arm and to an EOAT wherein each of the first and second plates are connected together by a frustoconical surface thereon having an angle of inclination with respect to the Z axes of the first and second plates and a depth which will allow pivotal release of the first and second plates with respect to a magnet for holding the plates together when an overload condition is imposed between the first and second plates and wherein a pair of opposed surfaces are formed on the first and second plates for receiving a pressure release medium therebetween so as to overcome the attractive force of the magnet to produce separation of the first and second plates when one of the plates is captured in the nest of a tool crib to thereby change tools on the first plate without imposing a damaging load on the robot arm.

Still another object of the present invention is to provide the robot tool changer and overload device of the preceding object and wherein the release surfaces produce a pneumatic force in the direction of the Z axes of the first and second plate to produce a separation force therebetween of a magnitude in excess of that of said magnet so as to allow a robot arm to remove one of the plates from a plate nested within the tool crib without imposing an overload on the robot arm.

Other objects, desires and advantages of the invention will become more apparent to those skilled in the art as the nature of the invention is better understood from the accompanying drawings and the following detailed description.

DESCRIPTION OF THE PREFERRED EMBODIMENT

Figure 1:
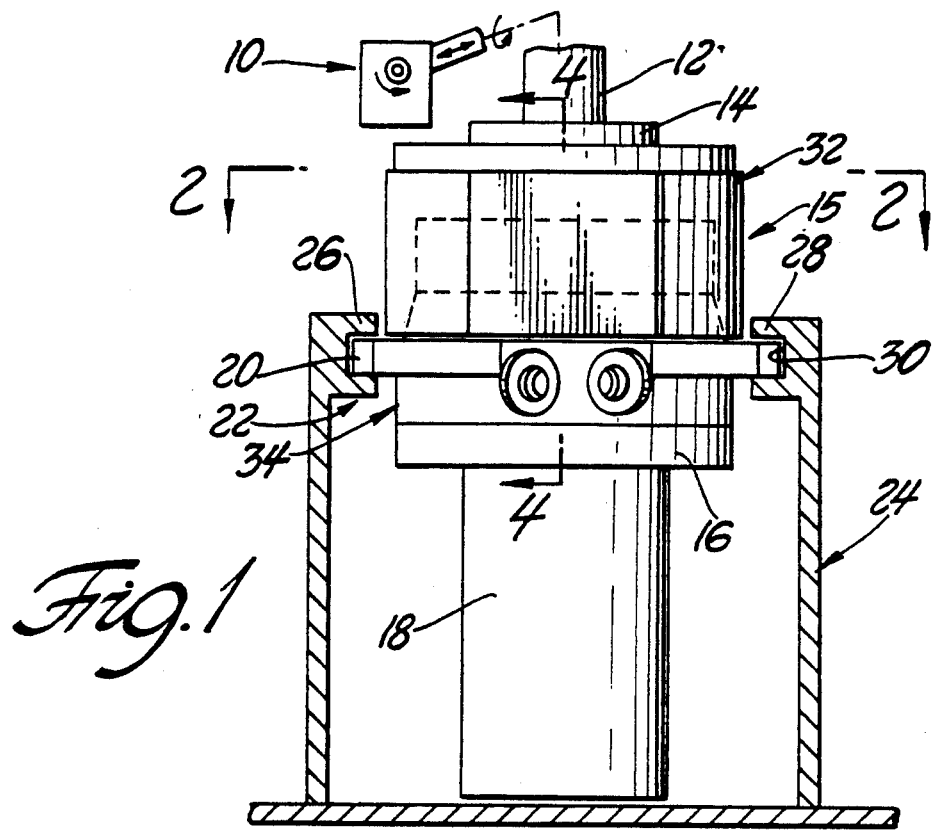
FIG. 1 is a side elevational view of the present invention shown nested in a tool crib shown in cross-section.
Figure 2:
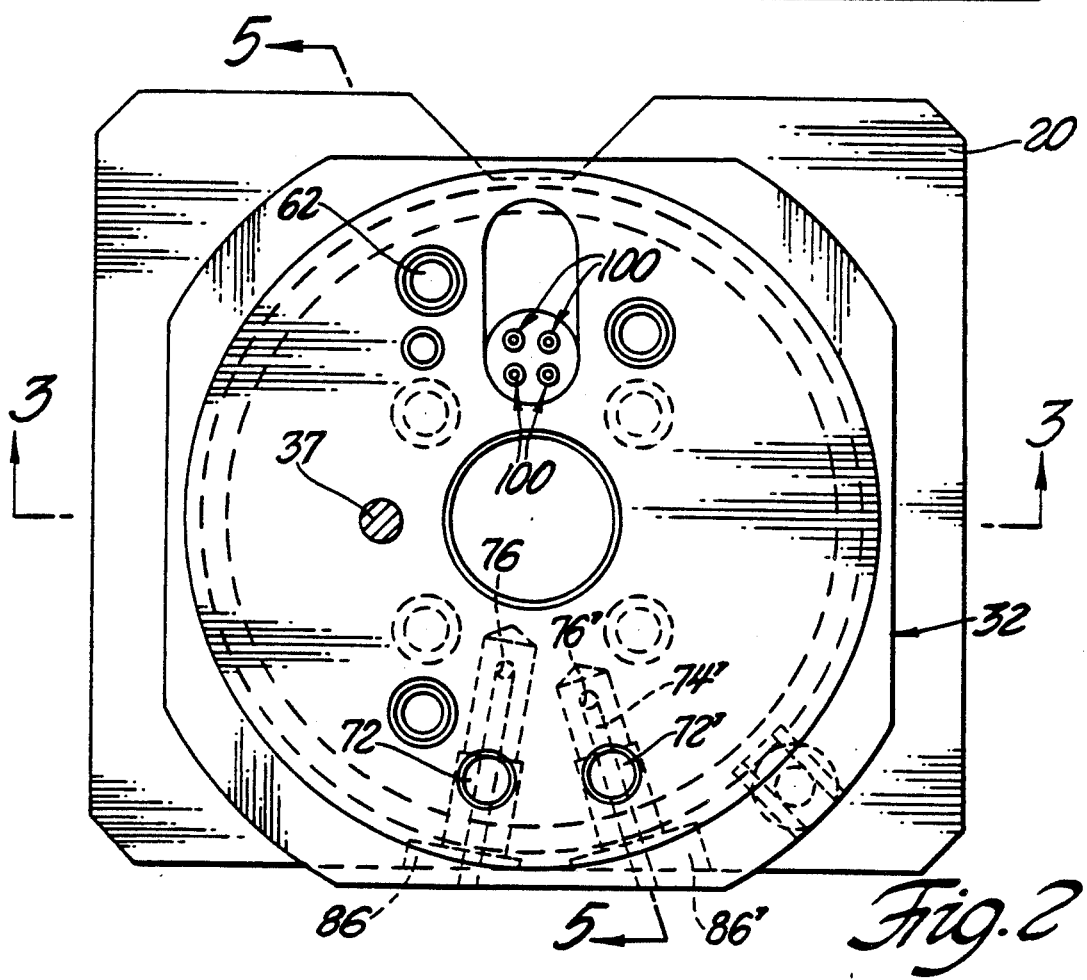
FIG. 2 is a top elevational view of the present invention looking in the direction of the arrows 2—2 in FIG. 1.

Referring to FIGS. 1 and 2, a diagrammatically shown robot 10 is illustrated having a robot arm 12 with an end plate 14 connected to one end of a robot tool changer and overload device 15 constructed in accordance with the present invention.

The opposite end of the robot tool changer and overload device 15 is connected to a plate 16 on an end of arm tooling device or EOAT 18 shown in outline form. In accordance with certain principles of the present invention, the robot tool changer and overload device 15 has a mounting flange 20 for removably supporting the device 15 in a support nest 22 of a tool crib 24. While the tool crib 24 shows only a single nest, it should be understood that in practice such cribs comprise a plurality of such nests. Each nest 22 is formed by a pair of spaced rails 26, 28 forming a support track having a depth substantially equal to that of the mounting flange 20 and capturing the mounting flange 20 to prevent it from being moved along the Z axis of the device 15. The mounting flange 20 is movable laterally of the tool crib 24 through side opening 30 therein for removing a selected EOAT from the tool crib 24. The selection of a particular EOAT will depend upon the processing sequence to be conducted on a workpiece or workpieces by the robot 10.

Figure 3:
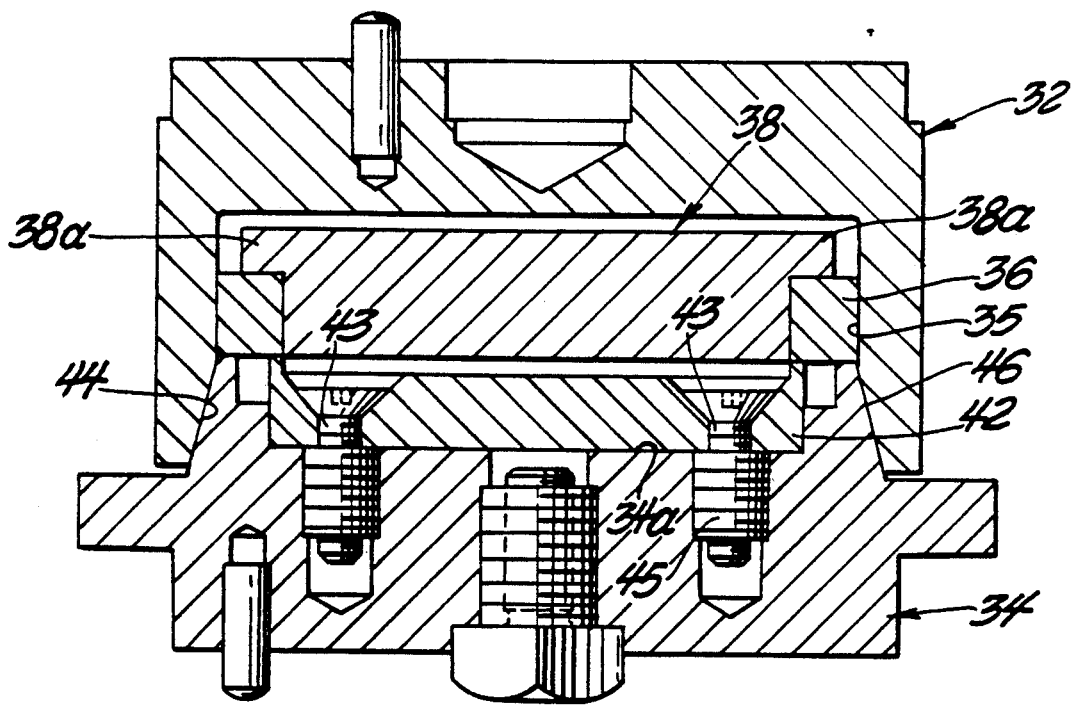
FIG. 3 is a cross-sectional view taken along the line 3—3 of FIG. 2, looking in the direction of the arrows.
Figure 4:
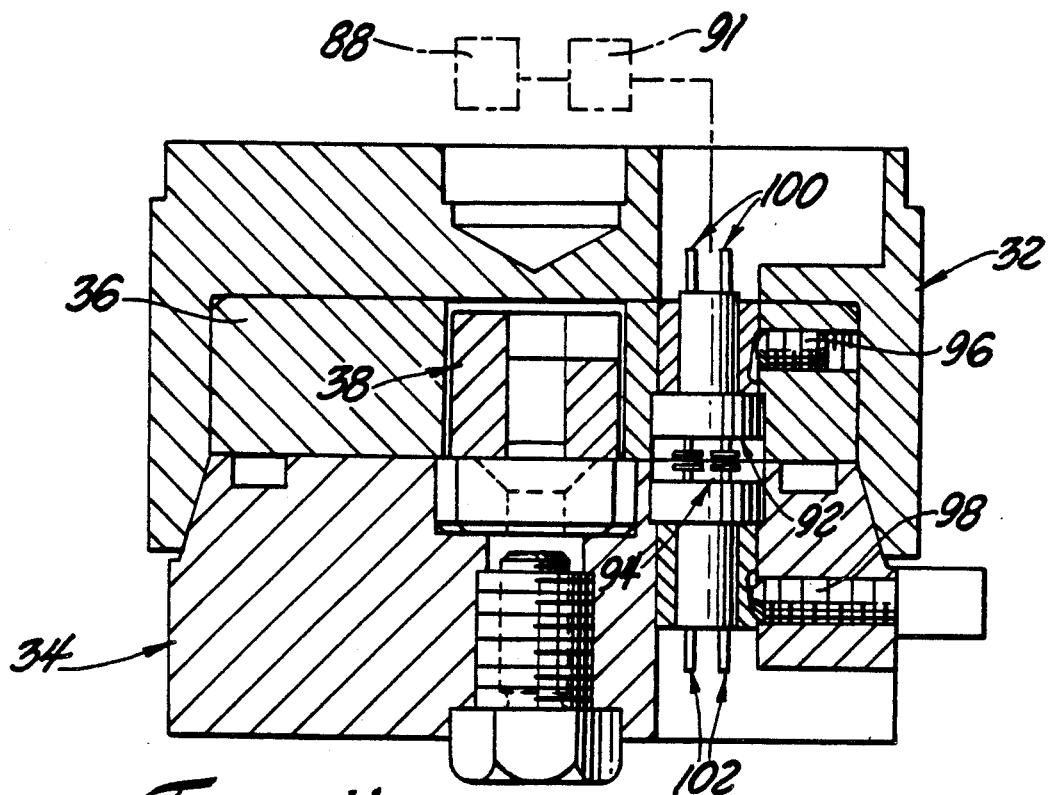
FIG. 4 is a sectional view taken along the line 4—4 of FIG. 1, looking in the direction of the arrow.

In accordance with certain principles of the present invention, the robot tool changer and overload device 15 includes an upper plate 32 and a lower plate 34. As shown in FIGS. 3 and 4, the upper plate 32 has a circular opening 35 therein in which is fitted a support plate 36. The support plate 36 is oriented with respect to air supply and electrical connections (to be described) by a dowel pin 37c fit between plates 32 and 36. The upper plate 32 also carries a rectangular permanent magnet 38 at end flanges 38a thereof. The permanent magnet 38 is connected to the inner surface 32a of the upper plate by suitable fastening means. The permanent magnet cell 38 is a MAGNEQUENCH magnetic cell of a type manufactured by General Motors Corporation. A more detailed explanation of such magnets is set forth in U.S. Pat. No. 4,496,395 with a common assignee to that of the present application.

The permanent magnet 38 is operatively associated with a steel insert 42 which is connected to the inner surface 34a of the lower plate 34 by screws 43 threadably received by internally threaded inserts 45 in lower plate 34.

Figure 5:
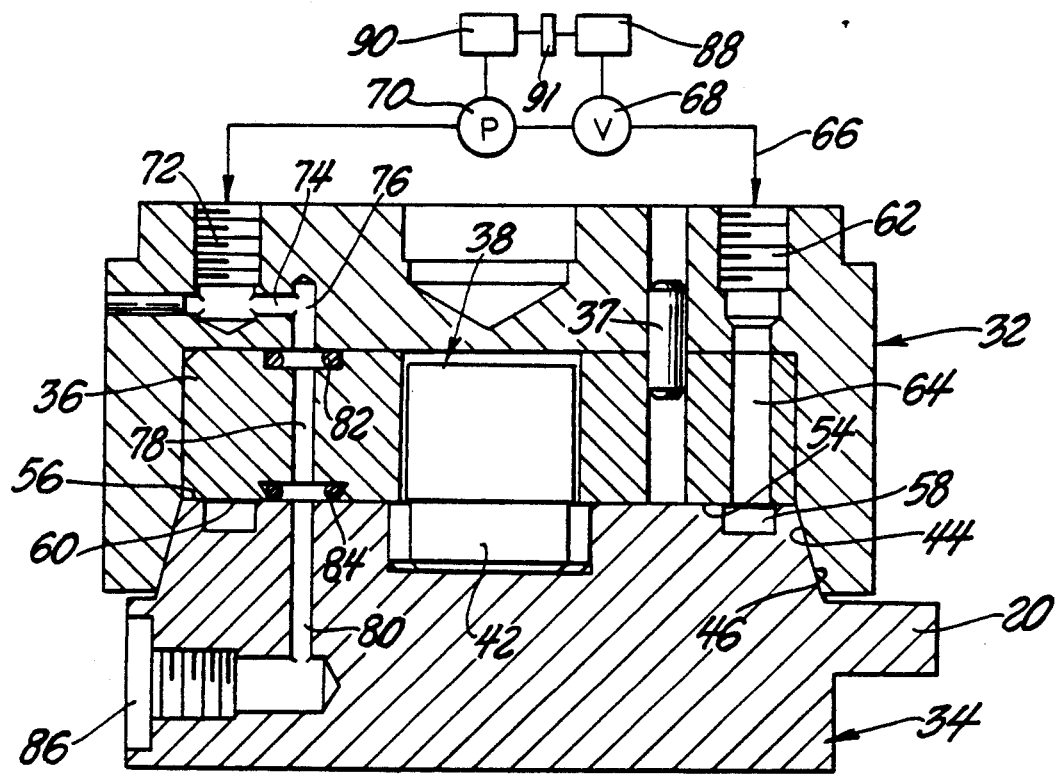
FIG. 5 is a sectional view taken along the line 5—5 of FIG. 2, looking in the direction of the arrows.

When the permanent magnet 38 is located in a predetermined spaced relationship to the steel insert 42, it will produce a magnetic attraction between the upper and lower plates 32, 34 to cause them to be joined. More particularly, the upper plate 32 includes a frustoconical surface 44 thereon that defines a nest to receive a congruent frustoconical surface 46 on the lower plate 34. The frustoconical surfaces 44, 46 are located in overlapping engagement with one another, as shown in FIG. 5, when the upper and lower plates 32, 34 are magnetically connected to one another. The surfaces 44, 46 define a bearing surface for supporting normal loading on the robot arm 12 and the EOAT 18.

Figure 6:
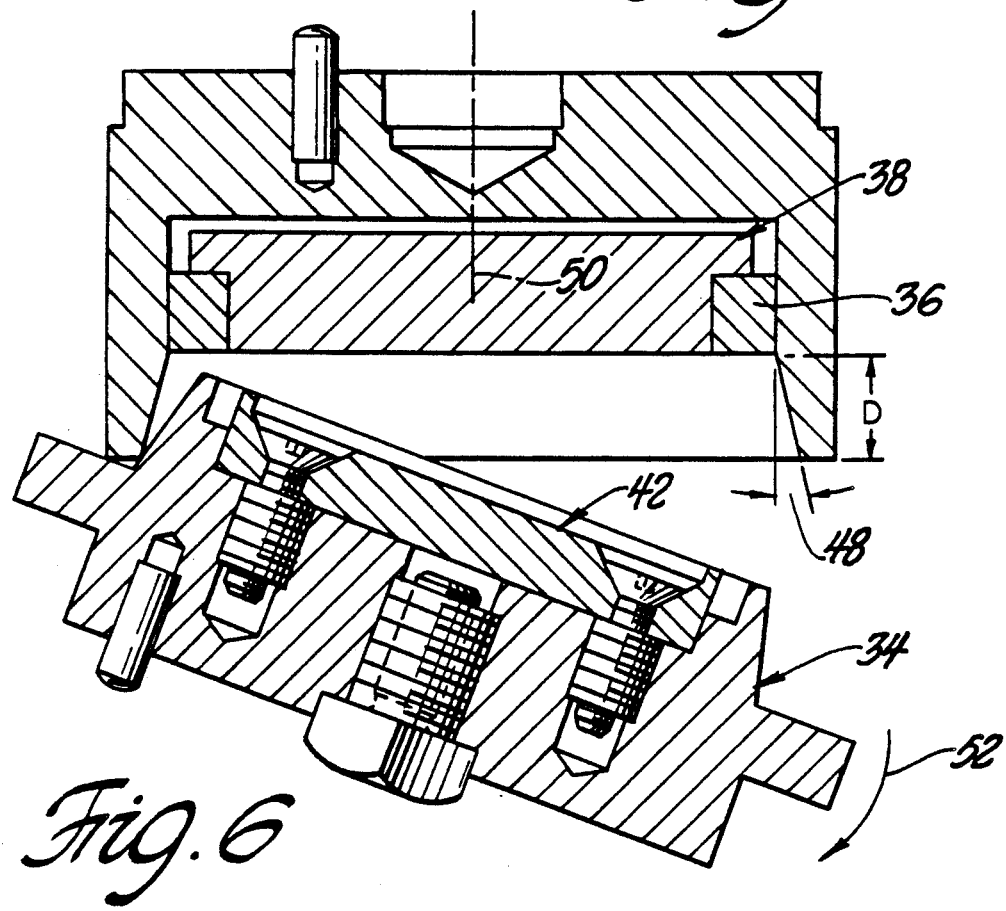
FIG. 6 is a view like FIG. 3 showing an EOAT plate of the present invention in a tilted, breakaway position.

In accordance with certain principles of the present invention, the frustoconical surfaces 44, 46 have a depth which will enable one side of the lower plate 34 to be tilted downwardly with respect to the other side of the upper plate 32, as shown in FIG. 6, to release the upper and lower plates 32, 34 so as to be broken apart when an overload force is applied therebetween.

The frustoconical surfaces 44, 46 have an angle of inclination 48 which is formed as an acute angle to the direction of Z axis 50 of the device 15 as shown in FIG. 6. The angle of inclination and the depth D of the frustoconical surfaces 44, 46 combine to assure clean breakaway when an overload release moment 52 is applied by a force located on the device 15 in the Z axis direction along either the X or Y axis.

Such release moment 52 will produce the tilting movement shown between the nested, normal operating position of FIG. 5 and the tilt breakaway position of FIG. 6. In order to assume the tilt breakaway position, the overload release moment 52 must produce a relative separation force between the upper plate and the lower plate 32, 34 that exceeds the magnetic attraction force between the permanent magnet 38 and the steel insert 42. Once this occurs, at any point around the circumference of the device 15, the lower plate 34 will assume the breakaway position shown in FIG. 6 at which point the attraction force between the upper and lower plates 32, 34 is instantaneously eliminated so as to assure that the overload force will not be transferred to the robot arm 12 in a manner that will cause the robot 10 to be damaged. The plates 32, 34 can be completely separated. Alternatively, they can be tethered so that the EOAT remains loosely connected to the robot arm 12 following separation.

In the illustrated arrangement, the frustoconical surfaces 44, 46 are formed completely circumferentially of the respective plates 32, 34. The circumferential form allows a universal release action in any direction between the plates to protect against overloads in any robot operation wherein it is desired to protect the robot arm 12 from forces imposed on the EOAT during the operation of the robot.

In accordance with other principles of the present invention, the support plate 36 on the upper plate 32 has a surface 54 arranged perpendicular to the Z axis 50. The lower plate 34 has a surface 56 arranged perpendicularly to the Z axis and in juxtaposed opposition to the surface 54 when the plates 32, 34 are connected.

The opposed surfaces 54, 56 are located in sealing engagement with one another when the upper and lower plates 32, 34 are interlocked as shown in FIG. 5. The surface 56 includes an annular channel 58 therein which is covered by an annular segment 60 of the surface 54. The annular channel 58 has high pressure air directed therethrough through a tapped inlet 62 in the upper plate 32, thence through an axial passage 64 in the support plate 36.

The tapped opening 62 is adapted to be connected to an air supply conduit 66 having a control valve 68 therein for selectively opening and closing the supply line 68 for directing air from a pressure source 70 on the robot 10. The robot pressure source 70 also supplies the pneumatic air pressure to the EOAT. The supply for such EOAT operation is through a tapped opening 72 in the upper plate 32, thence through drilled holes 74, 76, 78 and 80. The drilled hole 78 is sealed at the upper and lower end of the support plate 36 by O-rings 82, 84. The drilled hole 80 connects to air ports 86, 86', one of which is shown at 86 in FIG. 5, for supplying pressurized air to the EOAT. The air supply path to port 86' (in FIG. 2) is like that previously described. The like components seen in FIG. 2 are identified with like reference numerals primed.

Air flow through the valve 70 is under the control of a robot controller 88 which is operative to simultaneously open the valve 70 and to drive a robot drive 90 to move the robot arm 12 in the Z axis direction of the device 15 when it is desired to release or connect the robot from or to an EOAT in tool crib 24.

As shown in FIG. 4, electric power supply for the EOAT is supplied by pin contact sets 92, 94 (four pin contacts in each set). The contact set 92 has female pins and is held in the plate 32 by a set screw 96. The contact set 94 has male pins held in place on plate 32 by a set screw 98. Terminals 100, 102 on the contact sets 92, 94, respectively, are adapted to be connected respectively to power supply 91 and to the EOAT. Power supply to the EOAT is controlled by controller 88.

More particularly, by virtue of the aforedescribed controller 88, release of an EOAT from the robot is as follows. The device 15 is manipulated so as to move laterally through the side openings 30 into a nested relationship within a given one of a plurality of nests 22 in a multi-nest tool crib 24. At this point, in order to carry out a tool changer release operation in accordance with the present invention, the robot controller 88 will simultaneously open the valve 70 and will drive the robot drive 90 so as to cause the robot arm 12 to move only in a Z axis direction. As the arm 12 moves vertically, a pressure is directed into the annular channel 58. The pneumatic pressure will be imposed on the annular segment 60 of the surface 54 to produce a release force between the upper and lower plates 32, 34 of a magnitude to overcome the magnetic attractive force between the permanent magnet 38 and the steel insert 42. Accordingly, the robot arm 12 is separated from the EOAT that is supported by the mounting flange 20 in the tool crib. The separation occurs without imposing any overload or damaging force on either the robot arm 12 or the robot 10.

Tool change connection of the robot arm 12 to an EOAT is accomplished by reversing the aforedescribed release operation. Specifically, the upper plate 32 is directed along a Z axis until the magnet 38 is attracted to the steel insert 42 of a lower plate 34 on the EOAT which is to be selected from the tool crib 24. The valve 70 is closed so that there is no pneumatic release force imposed between juxtaposed surfaces 54, 56. Once the plates 32, 34 are coupled, the device 15 is moved laterally through the opening 30 so as to be removed from the crib 24 in preparation for a desired robot controlled processing sequence for the EOAT.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be described otherwise than as specifically set forth herein.

What is claimed is:

1. A robot tool changer and overload device having a robot connectible first plate and an end of arm tooling device connectible second plate and a magnet means for producing a magnetic force for holding the first and second plates together characterized by:

means forming coacting inclined surface means on said first and second plates defining a pivot point for separation of said first and second plates when a moment is applied therebetween of a magnitude to overcome the magnet force therebetween; said coacting inclined surface means having a depth and an included inclination angle formed acutely with respect to the longitudinal axis through said first and second plates to produce pivoting of one of said first and second plates through an acute angle corresponding substantially to that of said included angle to release said first and second plates when an overload occurs so as to release all force on the robot by complete separation of said first and second plates; and release means for imposing a release force between said first and second plates to produce separation between said first and second plates independently of the imposition of any overload moment thereon to allow movement of said first plate with respect to said second plate in a Z axis direction without imposing any load on the robot during such movement.

2. The robot tool changer and overload device of claim 1, further characterized by said surface means including a circular surface on said first plate having a depth and angle that will produce full separation of the second plate from the first plate simultaneously with the overload moment overcoming the magnetic force of said magnet means.

3. The robot tool changer and overload device of claim 1, further characterized by said surface means including a first circular inclined surface defining a female nest on said first plate formed circumferentially of said magnet means in surrounding relationship therewith and said surface means including a second circular inclined surface on said second plate forming a male insert locatable within said female nest so as to cause said first and second inclined surfaces to couple said first and second plates together.

4. The robot tool changer and overload device of claim 1, further characterized by said release means including opposed surfaces on said first and second plates and means for directing pressure medium between said opposed surfaces for overcoming the attractive force of said magnet means.

5. The robot tool changer and overload device of claim 2, further characterized by said inclined surfaces having a depth and an angle of inclination which will allow complete release of said first plate from said second plate by universal pivotal movement therebetween in response to imposition of a relative moment between said first and second plates produced by an overload force imposed thereon.

6. The robot tool changer and overload device of claim 3, further characterized by said inclined surfaces having a depth and an angle of inclination and a circumferential extent which will allow complete release of said first plate from said second plate by pivotal movement at any point along the full circumference of said inclined surfaces therebetween in response to imposition of a relative moment between said first and second plates produced by an overload force imposed thereon.

7. The robot tool changer and overload device of claim 4, further characterized by said first plate having an air passage therein adapted to be connected to a source of pressurized air and extending through said first plate; and means forming an annular channel in said second plate communicating with said air passage and facing said first plate and sealed with respect thereto when said first and second plates are held together by said magnet means so as to produce a Z axis pneumatic release force to overcome the magnetic attraction of said magnet means when pressurized air is directed into said annular channel.

8. The robot tool changer and overload device of claim 1, wherein said robot has a motor for moving said first plate away from said second plate along the Z axis, said robot tool changer and overload device further characterized by said pneumatic release means including a source of air pressure and valve means for controlling pressurization of said pneumatic release means, and said;

means on said second plate for supporting a tool in a tool crib against separation therefrom in a axial direction and for separation therefrom in a direction laterally of the axial direction;

and controller means to signal said robot for movement of said first plate in the axial direction away from said second plate and to activate said valve means to condition said release means for overcoming the magnetic force of said magnet means so as to change a tool from a robot without imposing a damaging load on a robot arm.

9. The robot tool changer and overload device of claim 8, further characterized by said release means including opposed surfaces on said first and second plates and means for directing pressure fluid between said opposed surfaces for overcoming the magnetic force of said magnet means.

10. The robot tool changer and overload device of claim 9, further characterized by said first plate having an air passage therein adapted to be connected to a source of pressurized air and extending through said first plate; and means forming an annular channel in said second plate communicating with said air passage and facing said first plate and sealed with respect thereto when said first and second plates are held together by said magnet means so as to produce a Z axis pneumatic release force to overcome the magnetic attraction of said magnet means when pressurized air is directed into said annular channel.

* * * * *